(12) United States Patent
Martí Sala et al.

(10) Patent No.: US 9,796,539 B2
(45) Date of Patent: Oct. 24, 2017

(54) SUCTION RETAINING DEVICE FOR RETAINING CONTAINERS ON A CONVEYOR

(71) Applicants: Jaime Martí Sala, Barcelona (ES); Alex Martí Mercadé, Sant Cugat del Vallès (ES)

(72) Inventors: Jaime Martí Sala, Barcelona (ES); Alex Martí Mercadé, Sant Cugat del Vallès (ES)

( * ) Notice: Subject to any disclaimer, the term of this patent is extended or adjusted under 35 U.S.C. 154(b) by 0 days.

(21) Appl. No.: 15/396,707

(22) Filed: Jan. 2, 2017

(65) Prior Publication Data

US 2017/0137233 A1    May 18, 2017

Related U.S. Application Data

(63) Continuation of application No. 15/044,780, filed on Feb. 16, 2016, now Pat. No. 9,567,162.

(30) Foreign Application Priority Data

Feb. 20, 2015    (EP) ..................................... 15380005

(51) Int. Cl.
*B65G 47/28*    (2006.01)
*B65G 47/84*    (2006.01)
(52) U.S. Cl.
CPC ........... *B65G 47/848* (2013.01); *B65G 47/28* (2013.01)
(58) Field of Classification Search
CPC .... B65G 47/846; B65G 47/848; B65G 47/28; B65G 29/00; B65G 47/26

USPC .......... 198/438, 370.12, 471.1, 689.1, 459.1, 198/459.2
See application file for complete search history.

(56) References Cited

U.S. PATENT DOCUMENTS

| | | | | |
|---|---|---|---|---|
| 3,907,095 A | * | 9/1975 | Russell | ................. B65G 47/91 198/407 |
| 5,297,666 A | * | 3/1994 | Marti Sala | ......... B65G 47/1457 198/380 |
| 5,957,655 A | * | 9/1999 | Gomez | ................ B65G 47/848 198/377.08 |
| 7,219,790 B2 | * | 5/2007 | Lanfranchi | .......... B65G 47/848 198/471.1 |
| 8,327,999 B2 | * | 12/2012 | Klaiber | ............... B29C 49/4205 198/470.1 |

(Continued)

*Primary Examiner* — James R Bidwell
(74) *Attorney, Agent, or Firm* — Robert J. Hess; Hess Patent Law Firm

(57) ABSTRACT

The suction retaining device for retaining containers on a conveyor comprises a plurality of retaining elements (7) moved by a conveyor along a path and a stationary suction chamber (10) connected to a low pressure source. Each retaining element (7) comprises a suction port (8) in communication with a suction outlet (9) via an air passage. The stationary suction chamber (10) has a perforated suction wall (11) parallel and adjacent to a convey section of the path along which the retaining elements are moved. The suction outlet (9) of each retaining element (7) is facing and adjacent to the perforated suction wall (11) during movement of the retaining element (7) along the convey section. The suction chamber (10) creates an air suction flow through the suction outlet (9), air passage and suction port (8) of each retaining element (7) which retains a container in the suction port (8) by suction.

7 Claims, 8 Drawing Sheets

(56) References Cited

U.S. PATENT DOCUMENTS

| | | | | |
|---|---|---|---|---|
| 8,739,961 B2* | 6/2014 | Marti Sala | ........... | B65G 47/848 |
| | | | | 198/471.1 |
| 9,567,162 B2* | 2/2017 | Marti Sala | ............. | B65G 47/28 |

* cited by examiner

SUCTION RETAINING DEVICE FOR RETAINING CONTAINERS ON A CONVEYOR

REFERENCE TO CO-PENDING PATENT APPLICATIONS

This is a continuation-in-part of parent application Ser. No. 15/044,780, now U.S. Pat. No. 9,567,162.

FIELD OF THE ART

The present invention generally relates to a suction retaining device for retaining containers on a conveyor and more in particular to a suction retaining device useful for retaining empty containers on a conveyor along a convey section from a receiving position, in which the containers are received on the conveyor, to a delivery position, in which the containers are delivered by the conveyor. The suction retaining device is applicable to a wide range of conveyors but is especially useful for conveyors in which the pitch at which the containers are conveyed, it is to say, the distance from one another of the conveyed containers, is variable along the convey section.

BACKGROUND OF THE INVENTION

Document EP 2226277 B1 describes a rotary conveyor for transferring containers comprising a rotor operated by a motor for rotating about a rotation axis. The rotor has a perimetric wall with a plurality of suction openings distributed along its periphery in correspondence with retaining elements configured for being coupled with the containers. In an inner region of the perimetric wall of the rotor, there is a stationary suction chamber connected to a low pressure source. The suction chamber defines a laterally open channel facing the perimetric wall along a predetermined circumferential arc, such that the suction chamber is partly demarcated by the perimetric wall of the rotor and such that when the rotor rotates, the suction openings are communicated directly with the suction chamber along the predetermined circumferential arc. As the rotor rotates, a container is retained in each of the retaining elements by suction at the start of the predetermined circumferential arc, conveyed by the rotor along the predetermined circumferential arc, and released at the end of the predetermined circumferential arc.

Document EP 2722296 A1 discloses a rotary apparatus for transferring containers comprising a rotary platform rotating about a rotation axis, a plurality of guiding elements fixed to the rotary platform and a plurality of grooves parallel to the guiding elements formed in the rotary platform. The guiding elements and grooves are uniformly distributed around the rotation axis and extend from a peripheral region to a central region of the rotary platform. A stationary closed-loop cam defining a path not centered with respect to the rotation axis is located below the rotary platform. Each guiding element has coupled thereto a runner provided with a cam follower inserted through the corresponding groove and coupled to the closed-loop cam, such that each runner performs a back and forth movement along the corresponding guiding element during one rotation of the rotary platform.

In the rotary conveyor of the mentioned document, EP2722296A1, each runner has fixed thereto a retaining element provided with a suction port suitable for retaining a container, and each suction port is in communication with a suction chamber through a corresponding suction conduit. The suction chamber is located in a stationary position below the rotary platform and has an upper wall in contact with a lower surface of the rotary platform. The closed-loop cam and a suction groove parallel to a portion of the path defined by the closed-loop cam are formed in this upper wall of the suction chamber. The suction conduit of each runner has an open lower end which communicates with the suction chamber through an intersection of the corresponding groove formed in the rotary platform and the suction groove formed in the suction chamber, and this open lower end of the suction conduit follows the changing position of the mentioned intersection during the back and forth movement of the runner occurring during a part of each rotation of the rotary platform.

DISCLOSURE OF THE INVENTION

The present invention provides a suction retaining device for retaining containers on a conveyor. The suction retaining device comprises a plurality of retaining elements moved by a conveyor along a path and a stationary suction chamber connected to a low pressure source. Each of the retaining elements comprises a suction port suitable for retaining a container and a suction outlet in communication with the suction port via an air passage. The stationary suction chamber has a perforated suction wall arranged parallel and adjacent to a convey section of the path along which the retaining elements are moved. The perforated suction wall has a plurality of holes distributed throughout same. The suction outlet of each retaining element is facing and adjacent to the perforated suction wall of the suction chamber during movement of the retaining element along the convey section of the path. The suction chamber creates an air suction flow through the suction outlet and the suction port of each retaining element which retains a container in the suction port of each retaining element by suction.

In one embodiment, the stationary suction chamber has an air outlet connected to the low pressure source, and the air outlet has an outlet air passage area. Each hole of the plurality of holes of the perforated suction wall has a hole air passage area, and the sum of the hole air passage areas of the plurality of holes of the perforated suction wall is preferably equivalent or approximately equivalent to the outlet air passage area of the air outlet of the suction chamber.

In one embodiment, the plurality of holes of the perforated suction wall of the suction chamber are uniformly distributed along the length and width of the perforated suction wall.

In one embodiment, the suction port and the suction outlet of each retaining element are located on opposite sides of the retaining element. In a preferred embodiments, the suction outlet and the suction port are located a same level with respect to the path of the conveyor and the air passage is a straight air passage.

BRIEF DESCRIPTION OF THE DRAWINGS

The foregoing and other advantages and features will be better understood from the following detailed description of a merely illustrative and non-limiting embodiment with reference to the attached drawings, in which.

DETAILED DESCRIPTION OF AN EMBODIMENT

Figure 6:
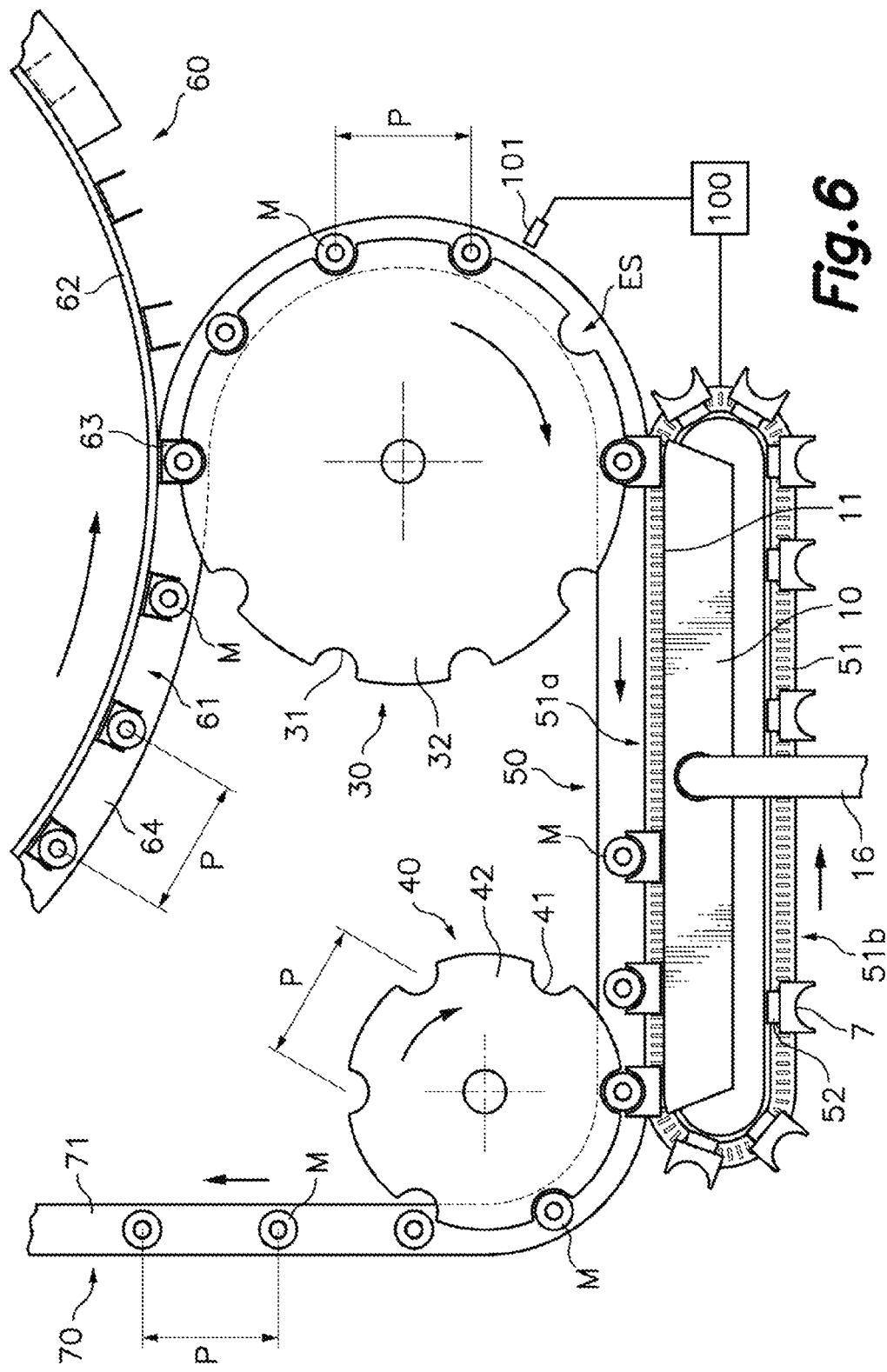
FIG. 6 is a top view of the suction retaining device of the present invention applied to a void compensating conveyor which is not part of the present invention.
Figure 7:
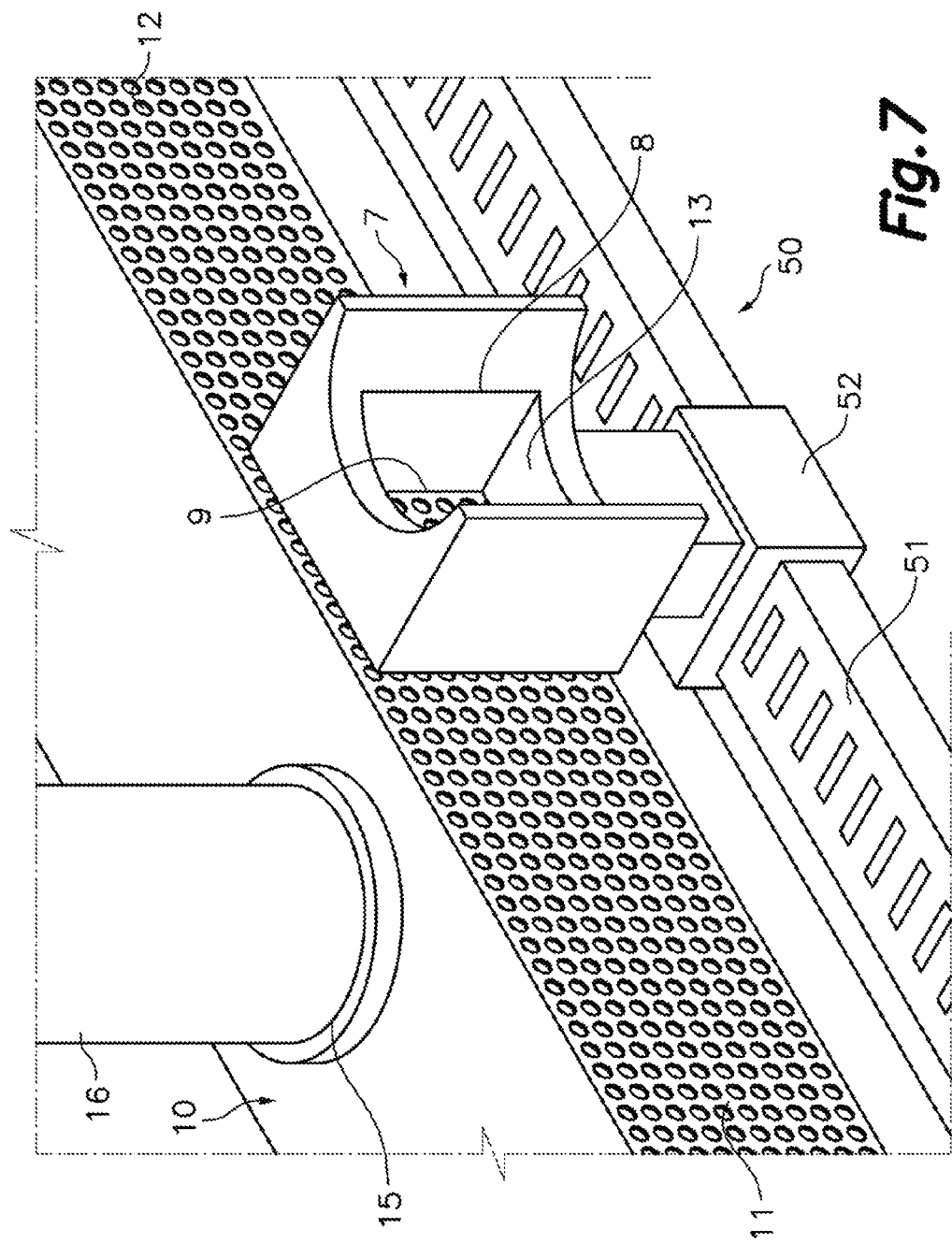
FIG. 7 is a partial perspective view of the suction retaining device applied to the void compensating conveyor of FIG. 6.
Figure 8:
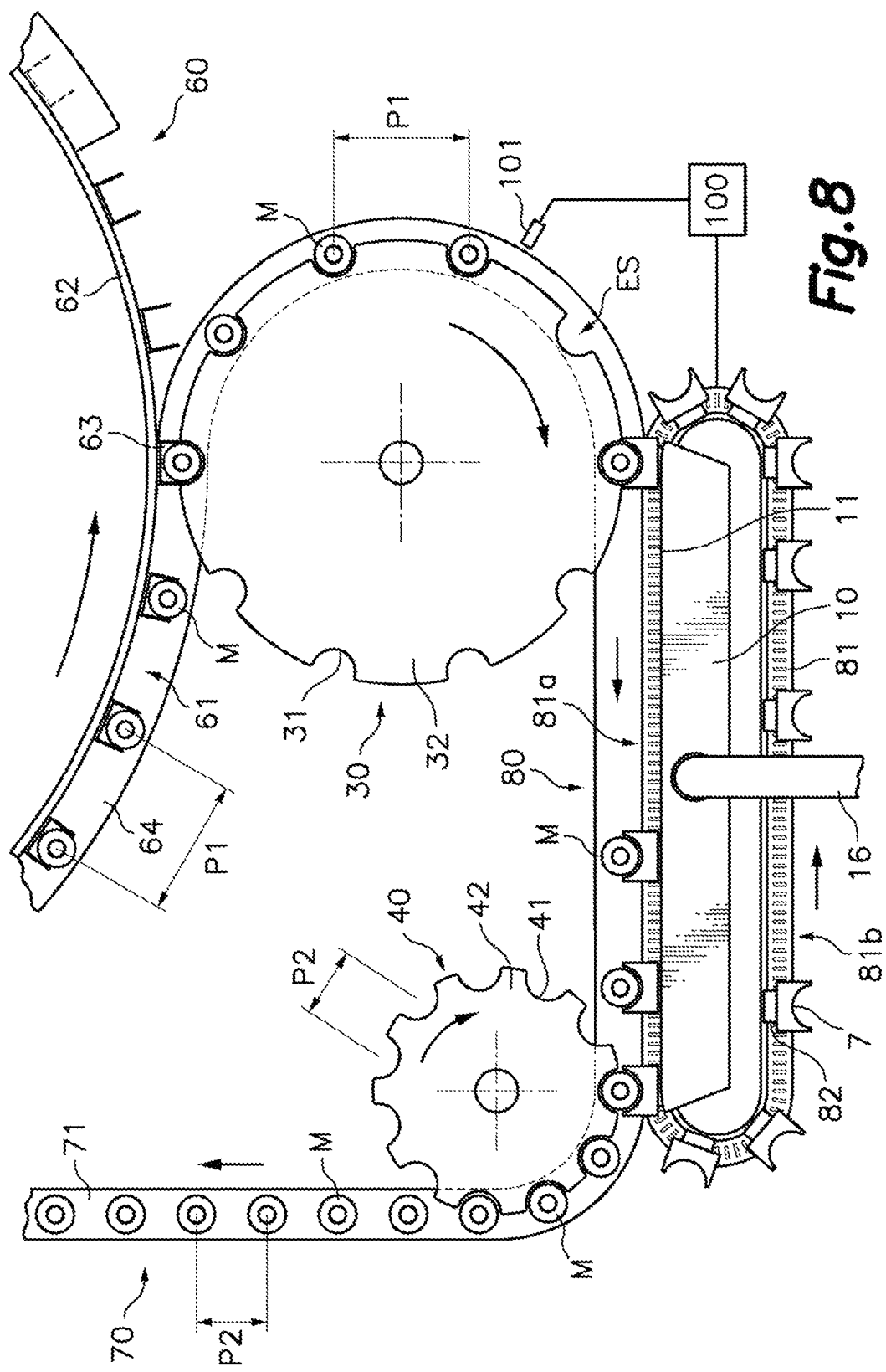
FIG. 8 is a top view of the suction retaining device of the present invention applied to a void compensating and pitch changing conveyor which is not part of the present invention.

FIGS. 1 to 4 show a suction retaining device according to an embodiment of the present invention applied to a pitch changing rotary conveyor, FIGS. 6 and 7 show the suction retaining device of the present invention applied to a void compensating conveyor, and FIG. 8 shows the suction retaining device of the present invention applied to a void compensating and pitch changing conveyor. The pitch changing rotary conveyor, the void compensating conveyor and the void compensating and pitch changing conveyor, which do not belong to the present invention, are mere examples of conveyors to which the suction retaining device of the present invention can be applied and have in common that the pitch at which the containers are conveyed, it is to say, the distance from one another of the conveyed containers, is variable along a convey section.

As shown in FIGS. 1 to 4, the suction retaining device is applied to the pitch changing rotary conveyor, which comprises a mount 14 having a horizontal surface on which a closed-loop cam 4 is fixed in a stationary position. The mount 14 furthermore supports a drive shaft 16 by means of ball bearings 18 (FIG. 4), such that the drive shaft 16 can rotate about a vertical rotation axis E. The drive shaft 16 has fixed thereto a driven pulley 19 (FIG. 3) which is part of a mechanical transmission connecting the driven pulley 19 fixed to the drive shaft 16 to a drive pulley (not shown) operated by a motor (not shown) such that the motor rotates the drive shaft 16 about the rotation axis E.

Figure 3:
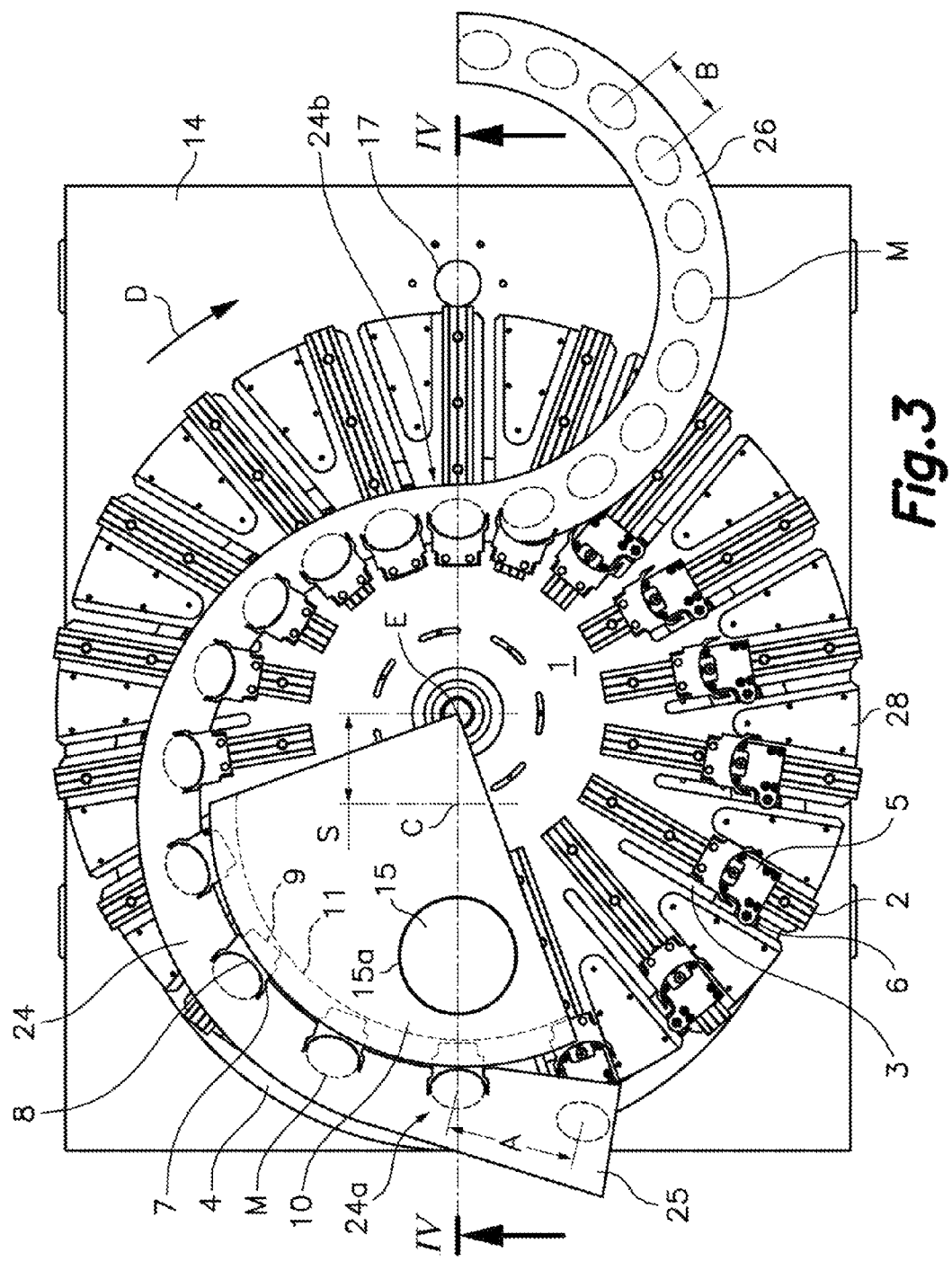
FIG. 3 is a top view of the pitch changing rotary conveyor of FIG. 1.
Figure 4:
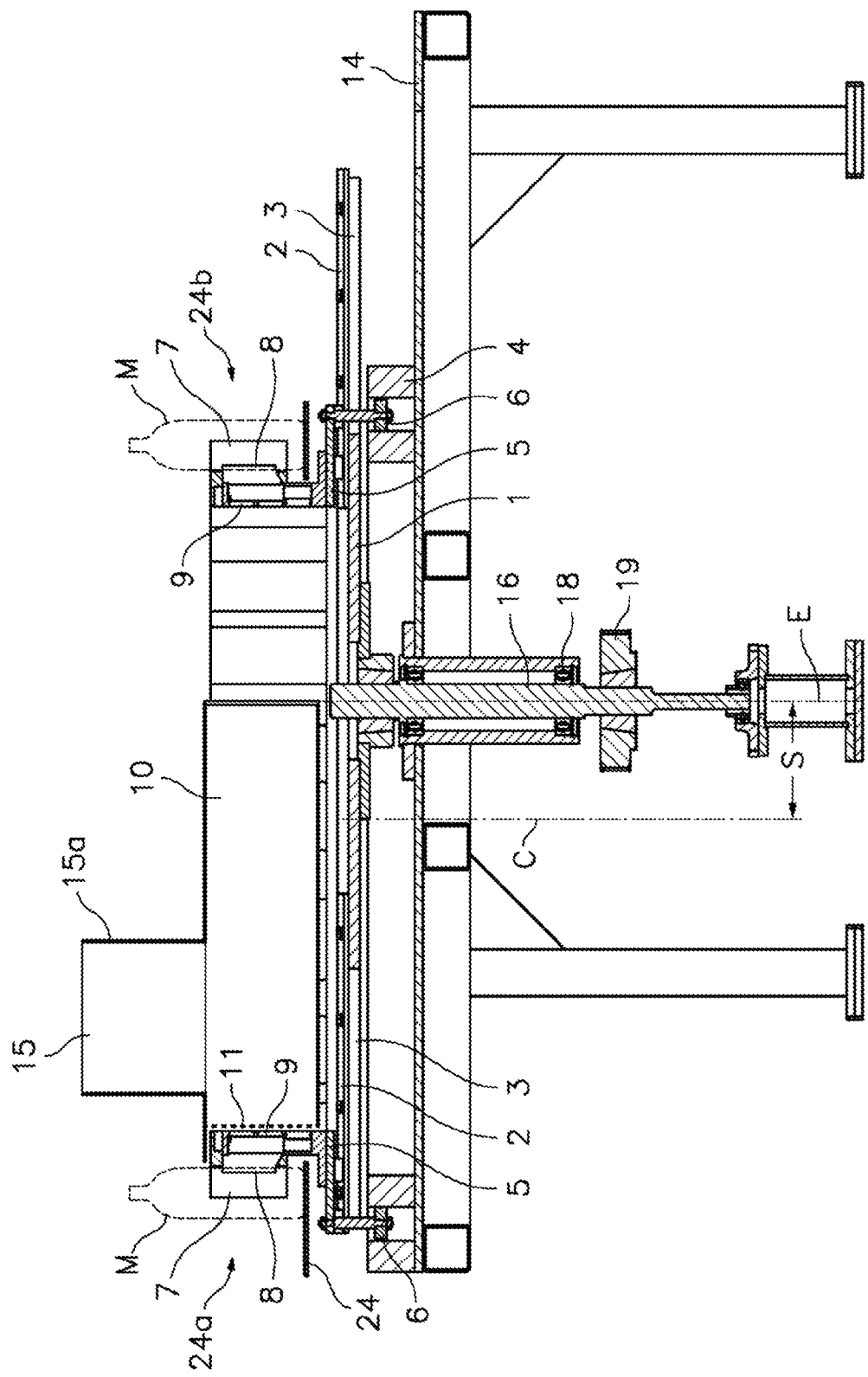
FIG. 4 is a cross-section view taken along plane Iv-Iv of FIG. 3.

An upper end of the drive shaft 16 is fixed to a rotary platform 1 located above the closed-loop cam 4, such that the rotary platform 1 rotates together with the drive shaft 16 about the rotation axis E in the direction indicated by means of arrow D in FIG. 3.

Figure 5:
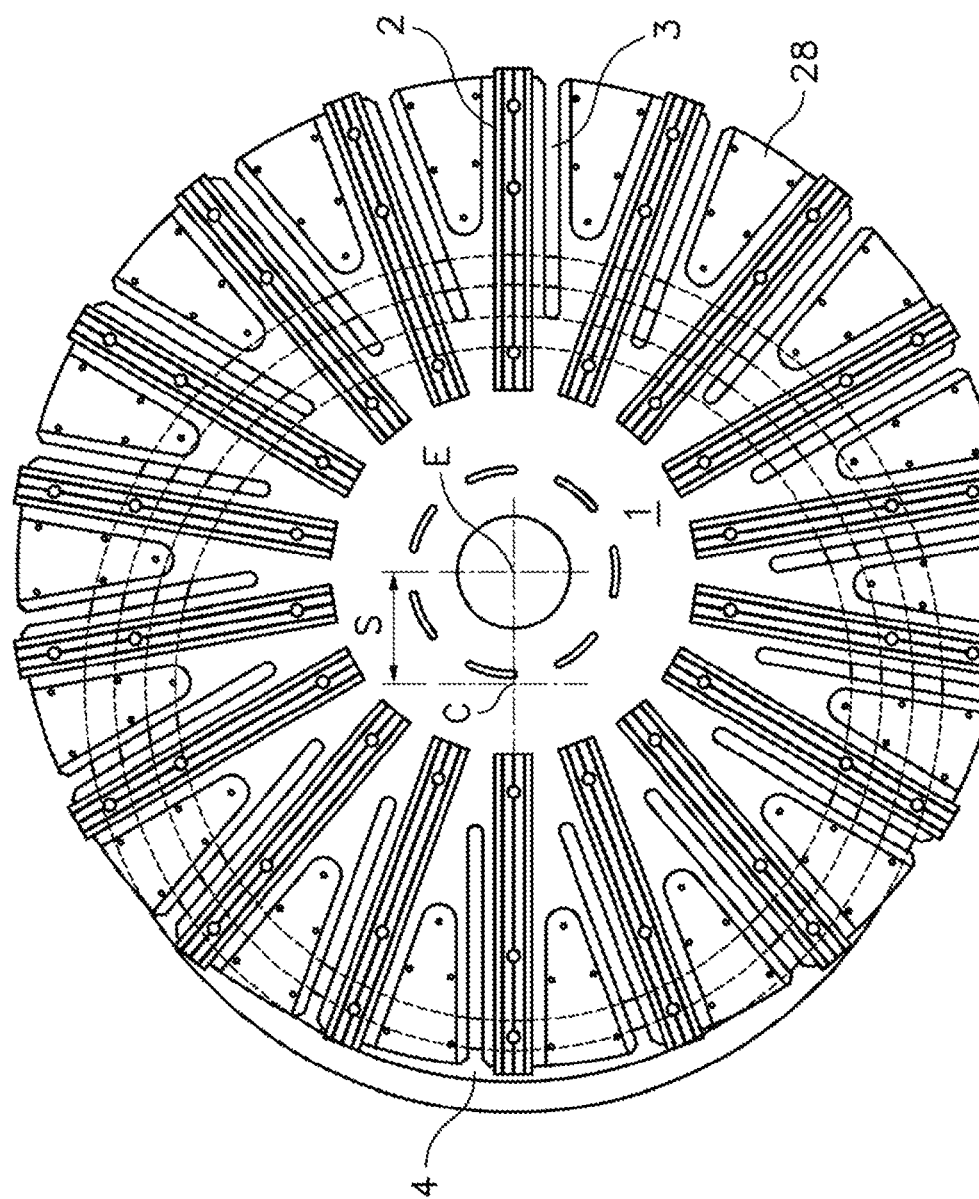
FIG. 5 is a top view of a rotary platform and a closed-loop cam which are part of the pitch changing rotary conveyor of FIG. 1.

As best shown in FIG. 5, the closed-loop cam 4 defines a circular path having a center C not centered with respect to the rotation axis E. In fact, the center C of the circular path of the closed-loop cam 4 is located at an off-center distance S from the rotation axis E of the rotary platform 1. Alternatively, the closed-loop cam could define other non-circular and non-centered paths with respect to the rotation axis E of the rotary platform 1 with an equivalent result.

A plurality of guiding elements 2 uniformly distributed around the rotation axis E are fixed on an upper surface of the rotary platform 1, and a plurality of grooves 3 are formed through the rotary platform 1, each groove 3 being located in a position parallel and adjacent to one of the guiding elements 2. Both the guiding elements 2 and the grooves 3 extend from a peripheral region to a central region of the rotary platform 1, as best shown in FIG. 5. In the illustrated example, the guiding elements 2 are arranged in radial positions.

Each of the guiding elements 2 has slidingly coupled thereto a runner 5 having fixed thereto a downwardly projecting cam follower 6 which is inserted through the corresponding groove 3. The cam followers 6 of all the runners 5 are coupled to the closed-loop cam 4 (FIGS. 3 and 4), such that when the rotary platform rotates about the rotation axis E, and in accordance with the eccentricity of the closed-loop cam 4, each runner 5 performs a back and forth movement along the corresponding guiding element 2 during one rotation of the rotary platform 1.

In the illustrated embodiment, the closed-loop cam 4 defines a groove provided with opposing side surfaces, and each cam follower 6 comprises a freely rotating wheel rolling alternately on both of the opposing side surfaces of the groove of the closed-loop cam 4 during one complete rotation of the rotary platform 1. In alternative embodiments (not shown), the closed-loop cam and the cam followers can have other configurations well known in the art with an equivalent result.

The mount 14 includes structural elements (not shown) supporting a suction chamber 10 in a stationary position above the rotary platform 1. The suction chamber 10 has a perforated suction wall 11 which is arranged parallel and adjacent to a convey section of the path not centered with respect to the rotation axis E defined by the closed-loop cam 4. The suction chamber 10 has an air outlet 15 provided with a cylindrical coupling 15a whereby the suction chamber 10 is connected to a low pressure source by means of a suitable conduit (not shown).

The perforated suction wall 11 has a plurality of holes 12 uniformly distributed along the length and width thereof, such that air is suctioned from the outside into the suction chamber 10 through the holes 12 of the perforated suction wall 11. The sum of the area of passage of all the holes 12 is preferably approximately equivalent to the area of passage of the air outlet 15 of the suction chamber 10.

Each of the runners 5 has fixed thereto a retaining element 7 having a suction port 8 and a suction outlet 9 on opposite sides thereof. The suction port 8 is facing the peripheral region of the rotary platform 1 and the suction outlet 9 is facing the central region of the rotary platform 1. The suction outlet 9 is located substantially at a same level over an upper surface of the rotary platform 1 than the suction port 8 and is in direct communication with the suction port 8 via a straight air passage 13. The suction port 8 is suitably configured for retaining a container M in the retaining element 7 by suction.

The suction outlet 9 of each retaining element 7 moves in a path facing and adjacent to the perforated suction wall 11 of the suction chamber 10 during a part of each rotation of the rotary platform 1 corresponding to the convey section, such that the suction chamber 10 creates an air suction flow through the suction port 8 of each retaining element 7 which retains a container M in the retaining element 7 by suction.

The mount 14 supports a support surface 24 arranged along a portion of the circumference of the rotary platform 1 and partially below the retaining elements 7. Containers M conveyed by the retaining elements 7 slide over the support surface 24 from an angular receiving position 24a (FIG. 3), in which one of the retaining elements 7 grips a container M from an infeed conveyor (not shown), to an angular delivery position 24b, in which this retaining element 7 delivers the container to an outfeed conveyor (not shown). The angular receiving and delivery positions 24a, 24b are fixed reference positions with respect to the mount 14.

The infeed and outfeed conveyors have respective support surfaces 25, 26 located at the same level as the support surface 24 of the rotary conveyor. The support surfaces 24, 25, 26 are associated with known stationary baffling elements and railing elements (not shown) cooperating in the guidance of containers M. In the illustrated embodiment, it is envisaged that the outfeed conveyor is a conventional fixed-pitch rotary conveyor (not shown) provided with a rotating shaft installed through an opening 17 (FIG. 3) existing in the mount 14, although the outfeed conveyor may alternatively be of any other type.

As illustrated in FIG. 3, containers M are conveyed in the infeed conveyor at a receiving pitch A, i.e., separated from one another by a first distance, and in accordance with the back and forth movement of the runners 5 in combination with the rotational movement of the rotary platform 1, contains M are delivered to the outfeed conveyor at a delivery pitch B, i.e., separated from one another by a second distance, the delivery pitch B being shorter than the receiving pitch A.

In the angular receiving position 24a (shown on the left side of FIGS. 3 and 4), the runners 5 are located in an outer limit position in relation to the back and forth movement thereof along the corresponding guiding element 2, whereas in the angular delivery position 24b (shown on the right side of FIGS. 3 and 4), the runners 5 are located in an inner limit position. Therefore, the radius of rotation of the runners 5 gradually decreases along the first portion of the rotation of the rotary platform 1 from the angular receiving position 24a to the angular delivery position 24b, and consequently the length of the arc between two retaining elements 7, equivalent to the pitch, is shortened accordingly.

The amplitude of the back and forth movement is selected such that the rotary conveyor with a change of pitch grips the containers M at a pitch equivalent to the receiving pitch A and delivers the containers M at a pitch equivalent to the delivery pitch B. Alternatively, the pitch changing rotary conveyor can be configured for working inversely, i.e., receiving containers M from the infeed conveyor at a receiving pitch which is shorter than the delivery pitch at which containers M are delivered to the outfeed conveyor.

The amplitude of the back and forth movement of the runners 5 can be changed to adapt the rotary conveyor to different pitches, replacing the closed-loop cam 4 with another one that defines a different path. To that end, the closed-loop cam 4 can be formed by two or more segments fixed to the mount 14 by means of fixing elements, and the rotary platform 1 has wide notches covered by removable covers 28, such that by removing the removable covers 28 the fixing elements can be accessed and the closed-loop cam 4 extracted and replaced without having to disassemble the rotary platform 1 and the suction chamber 10.

The retaining elements 7 can also be replaced with other elements to adapt the suction retaining device to different types of containers. To that end, each retaining element 7 is fixed to the corresponding runner by means of removable fixing elements such as screws or bolts.

FIGS. 6 and 7 shows the suction retaining device of the present invention applied to a void compensating conveyor 50 which makes part of a transfer apparatus useful for transferring containers M from a positioning machine 60 to a processing line 70 without changing the pitch P at which the containers are conveyed but and compensating for empty sites ES existing in the positioning machine 60. The transfer apparatus comprises a rotary unloading conveyor 30, a rotary transfer conveyor 40, and the aforementioned void compensating conveyor 50.

In the example illustrated in FIG. 6, the positioning machine 60 is a conventional rotary positioning machine, such as the one described in patent document WO2007028848A1, for example, having a circular output line 61, although the positioning machine may be of any other type. The processing line 70 comprises a conventional linear conveyor 71 based, for example, on a conveyor belt, although the processing line may take any other path and/or comprise another type of conveyor.

The illustrated positioning machine 60 has a rotary structure 62 provided with a circular periphery along which a plurality of output compartments 63 defining the mentioned output line 61 are uniformly distributed. Each of the output compartments 63 is configured for housing a container M in a vertical position, i.e., placed upright on its base. The output compartments 63 are separated from one another by a predetermined distance in the circumferential direction constituting a pitch P. In the illustrated example, the output compartments 63 have an open bottom and the containers M are driven by the rotary structure 62 sliding over a stationary support surface 64.

The rotary unloading conveyor 30 of the positioning apparatus also has a rotary structure 32 provided with a circular periphery tangent to the output line 61 of the positioning machine 60, and there are a plurality of unloading retaining elements 31 uniformly distributed along this circular periphery. Each of the unloading retaining elements 31 is suitable for retaining a container M in a vertical position. The unloading retaining elements 31 are separated from one another by a distance in the circumferential direction equivalent to the pitch P.

The rotating speed of the rotary structure 32 of the rotary unloading conveyor 30 and the rotating speed of the rotary structure 62 of the positioning machine 60 are controlled and synchronized such that the unloading retaining elements 31 of the rotary unloading conveyor 30 coincide with the output compartments 63 of the positioning machine 60 at a point of tangency between the paths of both. A first deflecting device (not shown) removes the containers M from the output compartments 63 of the positioning machine 60 and transfers them to the unloading retaining elements 31 of the rotary unloading conveyor 30.

The positioning machine 60 randomly produces a certain number of empty sites ES in its output compartments 63 which are inevitably passed on to the unloading retaining elements 31 of the rotary unloading conveyor 30. A detector 101, such as an optical detector or a motion detector, for example, is arranged adjacent to the circular periphery of the rotary unloading conveyor 30 such that it detects the empty sites ES in the unloading retaining elements 31 of the rotary unloading conveyor 30 and emits a signal representing the empty sites ES. It will be understood that the detector 101 may alternatively be arranged in relation to the circular periphery of the positioning machine 60 since there is a direct correlation between the empty sites ES in the positioning machine 60 and the empty sites in the rotary unloading conveyor 30.

The rotary transfer conveyor 40 has a rotary structure 42 provided with a circular periphery tangent to the processing line 70 and a plurality of transfer retaining elements 41 uniformly distributed along this circular periphery. Each of the transfer retaining elements 41 is suitable for retaining a container M in a vertical position. The transfer retaining elements 41 are separated from one another by a distance in the circumferential direction equivalent to the pitch P.

A second deflecting device (not shown) removes the containers M from the transfer retaining elements 41 of the rotary transfer conveyor 40 and transfers them to the linear conveyor 71 of the processing line 70. The rotating speed of the rotary structure 42 of the rotary transfer conveyor 40 and the conveyance speed of the linear conveyor 71 of the processing line 70 are controlled and synchronized such that the containers M received and conveyed in the linear conveyor 71 are separated from one another by a distance equivalent to the pitch P.

The rotary unloading conveyor 30 and the rotary transfer conveyor 40 can be of a conventional type, such as the one described in patent document WO 2010100539 A1, for example, or of any other type. The first and second deflecting devices can be of any conventional type.

The void compensating conveyor 50 comprises an electromagnetic rail 51 along which a plurality of runners 52 move. Each runner 52 has fixed thereto a corresponding retaining element 7 suitable for retaining a container M in a vertical position. The retaining elements 7 cooperates with a suction chamber 10 to constitute the suction retaining device of the present invention as will be explained in detail below with reference to FIG. 7. The electromagnetic rail 51 defines a closed path having a convey section 51a and a return segment 51b. The convey section 51a extends from a receiving point tangent to the circular periphery of the rotary unloading conveyor 30 to a delivery point tangent to the circular periphery of the rotary transfer conveyor 40.

The void compensating conveyor 50 can be based on the controlled motion system described in patent document U.S. Pat. No. 6876107 B2, for example, or on any other similar system, wherein the runners 52 can be operated independently for movement thereof along the electromagnetic rail 51 as a result of a magnetic field generated in the area of influence of each of the runners 52.

The electromagnetic rail 51 and the detector 101 are connected to a processing unit 100, such as a computer, a programmable logic processor, or an integrated circuit, for example, controlling the individual movements of each of the runners 52 according to the signals received from the detector 101 and with a pre-established programming to cause the retaining elements 7 of the void compensating conveyor 50 to receive containers M from the unloading retaining elements 31 of the rotary unloading conveyor 30 at the receiving point and deliver the containers M to all the transfer retaining elements 41 of the rotary transfer conveyor 40 at the delivery point regrouping the containers M when required to compensate for the empty sites ES existing in the positioning machine 60 and prevent the occurrence of empty sites ES in the processing line 70.

More specifically, the processing unit 100 individually controls the speeds, accelerations and directions of the movements of the runners 52 of the void compensating conveyor 50 in order to make each one of the retaining elements 7 carried by the void compensating conveyor 50 to coincide with each one of the unloading retaining elements 31 of the rotary unloading conveyor 30 which has a container M retained thereon at the receiving point, and such that all the retaining elements 7 of the void compensating conveyor 50 which have a container M retained thereon successively and respectively coincide with all the transfer retaining elements 41 of the rotary transfer conveyor 40 at the delivery point.

The processing unit 100 cooperates with or forms part of a central processing unit (not depicted) capable of correcting on the go the operating speeds of the positioning machine 60 and the rotary unloading conveyor 30 and/or the operating speeds of the processing line 70 and the rotary transfer conveyor 40 according to a device and method well known in the prior art for equalizing the rate, in terms of the number of containers M per unit of time, at which the containers are delivered by the positioning machine 60 and the rate at which the containers M are received to the processing line 70 once the empty sites ES are compensated for.

FIGS. 6 and 7 show an embodiment of the suction retaining device of the present invention applied to the void compensating conveyor 50. The suction retaining device comprises a plurality of retaining elements 7 moved by the void compensating conveyor 50 as explained above, and a suction chamber 10 having an air outlet 15 connected to a low pressure source.

As better shown in FIG. 7, each of the retaining elements 7 has a suction port 8 facing an outer side of the closed path defined by the electromagnetic rail 51. The suction port 8 is configured such that it is capable of retaining a container M by suction and is in communication via a straight air passage 13 with a suction outlet 9 facing an inner side of the closed path defined by the electromagnetic rail 51. The suction port 8 and the suction outlet 9 of each retaining element 7 are located on opposite sides of the retaining element 7 and substantially at a same level over a surface of the electromagnetic rail 51.

Figure 1:
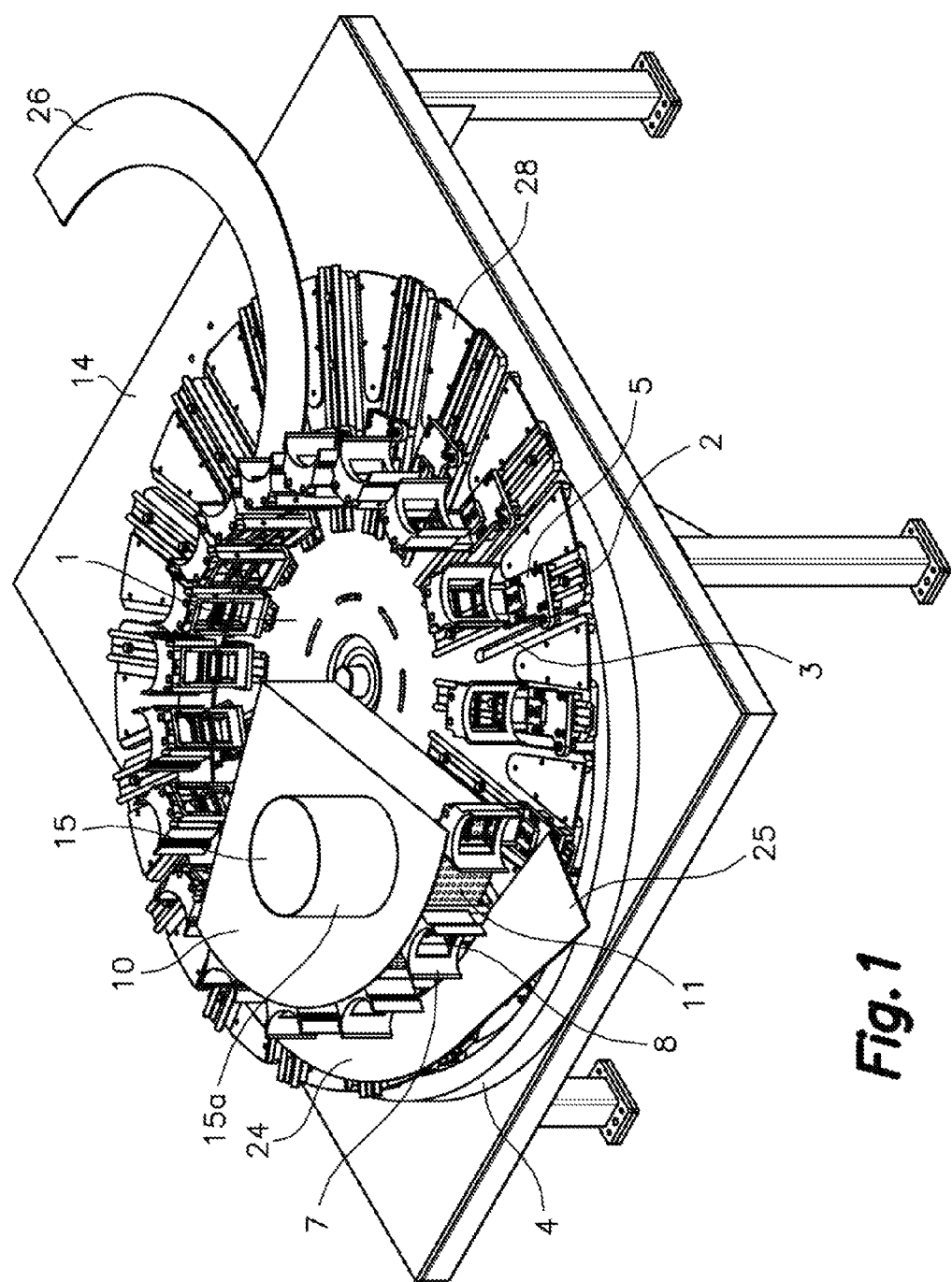
FIG. 1 is a perspective view of a suction retaining device for retaining containers on a conveyor according to an embodiment of the present invention applied to a pitch changing rotary conveyor which is not part of the present invention.
Figure 2:
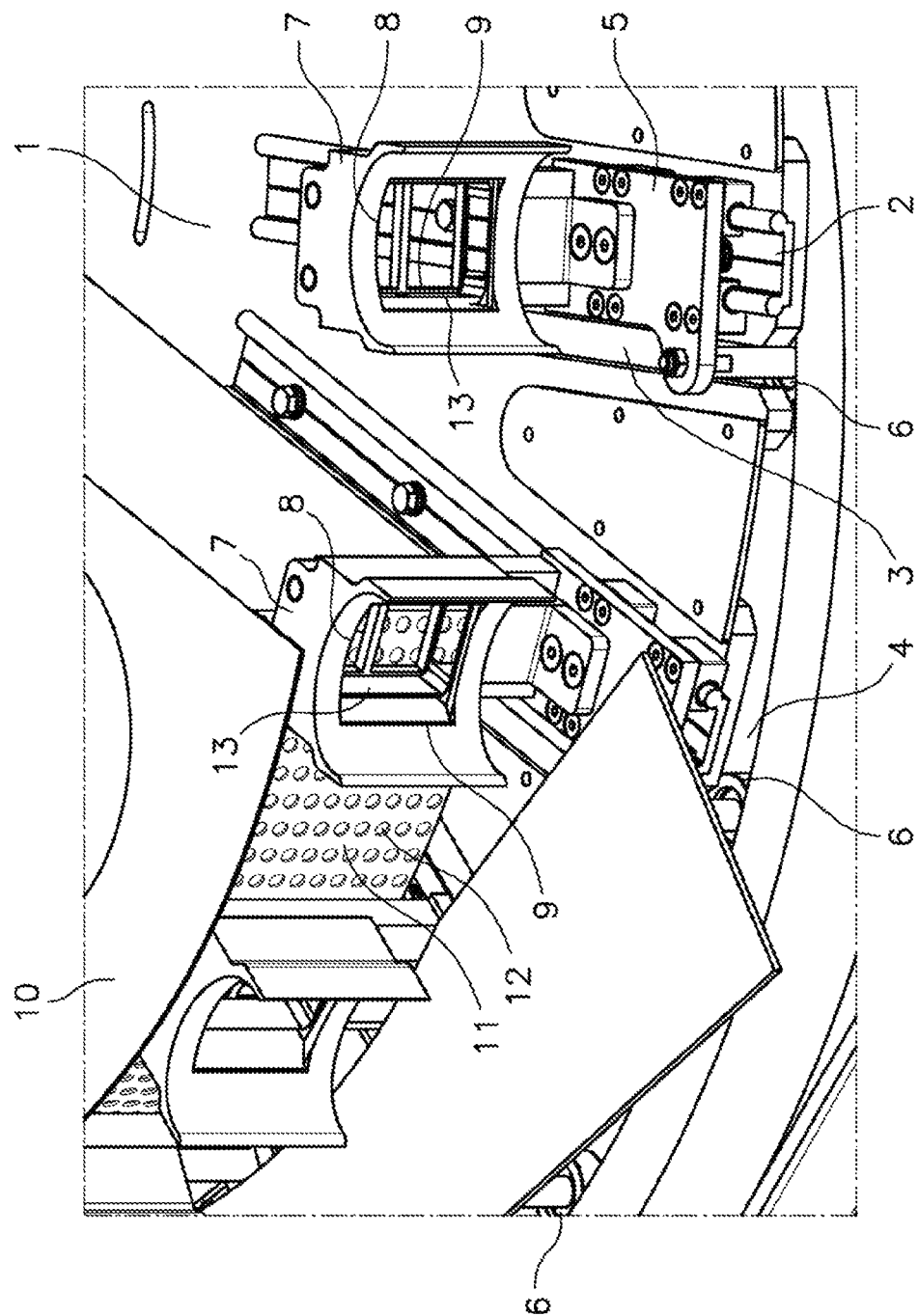
FIG. 2 is an enlarged detail of FIG. 1.

The suction chamber 10 is arranged along an inner side of the convey section 51a of the electromagnetic rail 51 and extends from the receiving point tangent to the circular periphery of the rotary unloading conveyor 30 to the delivery point tangent to the circular periphery of the rotary transfer conveyor 40 (see also FIG. 1). The air outlet 15 of the suction chamber 10 is connected to the low pressure source by means of a conduit 16. The suction chamber 10 has a suction wall 11 arranged parallel and along the convey section 51a of the electromagnetic rail 51, and the suction wall 11 has a plurality of suction holes 12 distributed along the length and width thereof.

When the retaining element 7 moves along the convey section 51a of the electromagnetic rail 51, the suction outlet 9 of the retaining element 7 is located facing and adjacent to the suction wall 11, and the air suctioned by the suction chamber 10 through the suction holes 12 of the suction wall 11 causes a suction stream through the suction outlet 9, straight air passage 13 and suction port 8 which is capable of retaining a container M by suction in the retaining element 7 while the retaining element 7 is moved along the convey section 51a of the electromagnetic rail 51.

Each hole of the plurality of holes 12 of the perforated suction wall 11 has an air passage area, and the sum of the air passage areas of the plurality of holes 12 of the perforated suction wall 11 is approximately equivalent to an air passage area of the air outlet 15 of the suction chamber 10.

FIG. 8 shows the suction retaining device of the present invention applied to a void compensating and pitch changing conveyor 80 included in a transfer apparatus useful for transferring containers M from a positioning machine 60 to a processing line 70 changing the pitch at which the containers are conveyed and compensating for empty sites ES existing in the positioning machine 60, where the transfer apparatus receives the containers M from the positioning machine 60 at a first pitch P1 and with empty sites ES and delivers the containers M to the processing line 70 at a second pitch P2 different from the first pitch P1 and without empty sites ES.

The transfer apparatus of FIG. 8 has the same elements described above in relation to FIG. 6, with the only difference that in FIG. 8 both the output compartments 63 of the positioning machine 60 and the unloading retaining elements 31 of the rotary unloading conveyor 30 are separated from one another by a first distance in the circumferential direction equivalent to the first pitch P1 and the transfer retaining elements 41 of the rotary transfer conveyor 40 are separated from one another by a second distance in the circumferential direction equivalent to the second pitch P2.

In the transfer apparatus of FIG. 8, the void compensating and pitch changing conveyor 80 is identical to the void compensating conveyor 50 described above with relation to FIG. 6, and comprises an electromagnetic rail 81 defining a closed path including a convey section 81a and a return segment 81b and a plurality of runners 82 independently moved along the electromagnetic rail 81 as a result of a magnetic field generated in the area of influence of each of the runners 82. The convey section 81a extends from a receiving point tangent to the circular periphery of the rotary unloading conveyor 30 to a delivery point tangent to the circular periphery of the rotary transfer conveyor 40.

The suction retaining device of the present invention shown in FIG. 8 applied to the void compensating and pitch changing conveyor 80 is identical to the suction retaining device described above with relation to FIGS. 6 and 7 applied to the void compensating conveyor 50, and comprises a plurality of retaining elements 7 and a suction chamber 10 connected to a low pressure source by means of a conduit 16. Each retaining element 7 is attached to one of the runners 52 of the void compensating and pitch changing conveyor 80 and comprises a suction port 8 configured for retaining a container M by suction and a suction outlet 9 in communication with suction port 8 via a straight air passage 13.

The suction chamber 10 has a suction wall 11 arranged parallel and along the convey section 51a of the electromagnetic rail 51, and the suction wall 11 has a plurality of suction holes 12 distributed along the length and width thereof. Air suctioned by the suction chamber 10 through the suction holes 12 of the suction wall 11 causes a suction stream through the suction outlet 9, straight air passage 13 and suction port 8 which is capable of retaining a container M by suction in the retaining element 7 while the retaining element 7 is moved along the convey section 81a of the electromagnetic rail 81.

However, in this case, the processing unit 100 individually controls the speeds, accelerations and directions of the movements of the runners 82 of the void compensating and pitch changing conveyor 80 such that the void compensating and pitch changing conveyor 80 is capable of causing the change in pitch from the first pitch P1 to the second pitch P2 in addition to regrouping the containers M when required to compensate for the empty sites ES existing in the positioning machine 60 and prevent the existence of empty sites ES in the processing line 70.

Although suction retaining device of the present invention has been described in relation to FIGS. 1 to 8 applied to conveyors having a variable pitch, it is also applicable to other kind of linear or rotary conveyors having a fixed pitch.

The scope of the present invention is defined in the attached claims.

The invention claimed is:

1. A suction retaining device for retaining containers on a conveyor, comprising:
    a plurality of retaining elements moved by a conveyor along a path, each of said retaining elements comprising a suction port configured for retaining a container by suction and a suction outlet in communication with the suction port via an air passage; and
    a stationary suction chamber connected to a low pressure source, said stationary suction chamber having a stationary perforated suction wall arranged parallel and adjacent to a convey section of said path, the retaining elements being moved at a variable pitch or independently from each other along said convey section, said perforated suction wall having a plurality of holes distributed throughout same;
    said suction outlet of each retaining element being facing and adjacent to said perforated suction wall of the suction chamber during movement of the retaining element along the convey section of the path, so that the suction chamber creates an air suction flow through the suction outlet, air passage and suction port of each retaining element which retains a container in the suction port of each retaining element by suction.

2. The suction retaining device according to claim 1, wherein the stationary suction chamber has an air outlet connected to said low pressure source.

3. The suction retaining device according to claim 2, wherein said air outlet of the suction chamber has an outlet air passage area, each hole of said plurality of holes of the perforated suction wall has a hole air passage area, and the sum of the hole air passage areas of the plurality of holes of the perforated suction wall is equivalent to the outlet air passage area of the air outlet of the suction chamber.

4. The suction retaining device according to claim 1, wherein the plurality of holes of the perforated suction wall of the suction chamber are uniformly distributed along the length and width of the perforated suction wall.

5. The suction retaining device according to claim 1, wherein the suction port and the suction outlet of each retaining element are located on opposite sides of the retaining element.

6. The suction retaining device according to claim 5, wherein the suction outlet and the suction port are located at a same level with respect to the path of the conveyor.

7. The suction retaining device according to claim 6, wherein said air passage communicating the suction outlet with the suction port is a straight air passage.

* * * * *